United States Patent [19]
Berson et al.

[11] Patent Number: 4,899,172
[45] Date of Patent: Feb. 6, 1990

[54] METHOD AND APPARATUS FOR PERFORATING INDICIA ON USED THERMAL TRANSFER RIBBON WITHIN A CASSETTE

[75] Inventors: William Berson, Westport; Julius Gluck, Norwalk; Patrick Murphy, Stamford; Christopher D. Smith, New Milford; Duc H. Tran, Bridgeport, all of Conn.

[73] Assignee: Pitney Bowes Inc., Stamford, Conn.

[21] Appl. No.: 138,425

[22] Filed: Dec. 28, 1987

[51] Int. Cl.4 ........................ G01D 15/10; B41J 32/00; B41J 33/02

[52] U.S. Cl. ................................ 346/76 PH; 400/120; 400/191; 400/227.1

[58] Field of Search .................... 346/76 PH; 400/120, 400/191, 228; 100/227.1

[56] References Cited

U.S. PATENT DOCUMENTS

| | | | |
|---|---|---|---|
| 3,330,399 | 7/1967 | Tumavicus | 400/227.1 |
| 4,496,955 | 1/1985 | Maeyama | 346/76 PH |
| 4,511,902 | 4/1985 | Nagashima | 346/76 PH |
| 4,740,798 | 4/1988 | Shinoazaki | 346/76 PH |

FOREIGN PATENT DOCUMENTS

| | | | |
|---|---|---|---|
| 60-105566 | 11/1983 | Japan | 400/120 |
| 61-031285 | 2/1986 | Japan | 400/120 |

*Primary Examiner*—Bruce A. Reynolds
*Assistant Examiner*—Scott A. Rogers
*Attorney, Agent, or Firm*—Donald P. Walker; Melvin J. Scolnick; David E. Pitchenik

[57] ABSTRACT

In printing apparatus of the type which includes structure for thermally transferring ink from a ribbon to a workpiece, wherein the ribbon includes a backing layer and an ink donor layer, there is provided a printing process which includes the step(s) of transferring ink from the ink donor layer to the workpiece and perforating the ribbon. Moreover, it is a feature of the invention to include the processing step of sensing perforating.

21 Claims, 5 Drawing Sheets

FIG. 4A
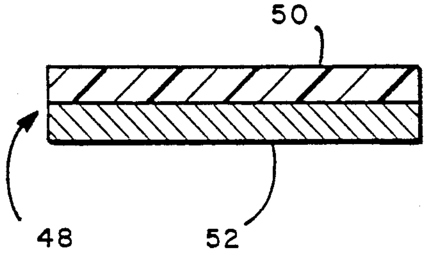
FIG. 4B
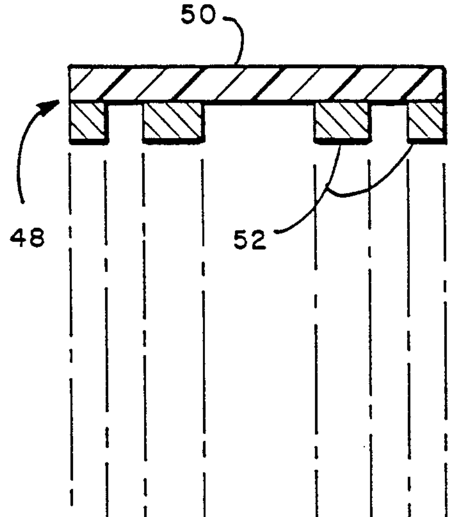
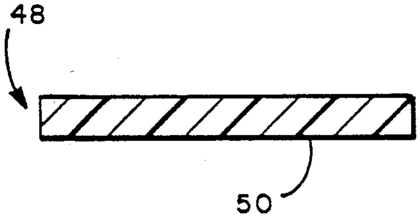
FIG. 4C
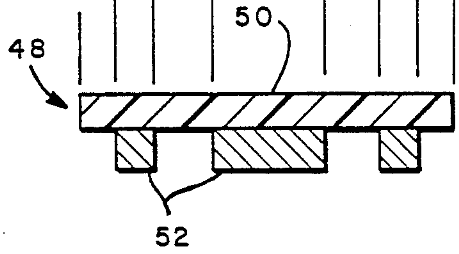
FIG. 4D

METHOD AND APPARATUS FOR PERFORATING INDICIA ON USED THERMAL TRANSFER RIBBON WITHIN A CASSETTE

BACKGROUND OF THE INVENTION

This invention is generally concerned with thermal printing apparatus for processing letters and more particularly with thermal printing apparatus including structure for perforating postage indicia images on used thermal transfer ribbons.

For marking letters, including letter mail, thermal transfer printing offers an advantage over die cast image transfer processes, in that images transferred by means of thermal transfer printing processes exhibit higher quality image resolution than other printing processes. In such processes, the postage indicia images remaining on the ribbon after transferring therefrom an ink pattern corresponding to postage indicia, is ordinarily directly or indirectly wound on a take-up spool. In this connection, reference is made to Danilo P. Buan, Albert C. Chiang and Donald T. Dolan U.S. patent application Ser. No. 000,584 for a Thermal Transfer Printing Apparatus And Method, filed Jan. 6, 1987 and assigned to the assignee of the present invention.

In the aforesaid patent application, a two-step thermal transfer printing process is disclosed wherein the ribbon from the supply spool is passed through a first printing station, at which an outline of indicia pattern of the postage indicia which is to be printed on a letter is removed from the ribbon, then passed through a second station at which the remaining postage indicia pattern is printed on the letter, thereby removing all ink from the ribbon and providing a "blank" ribbon, and then passed back through the first printing station where the outline of indicia pattern is printed on the blank ribbon before the ribbon is wound on the take-up spool. The ribbon wound on the take-up spool thus bears a series of images of postage indicia outlines, including the outline of the postage value included in the postage indicia printed on the letter. Since the indicia outlines, if printed on a letter, might escape detection (as unacceptable) by mechanized postage handling equipment used by Postal Services, there is a need to provide more security against fraudulent use of the used ribbon in thermal printing apparatus adapted for printing postage, and other monetary values.

Accordingly:

An object of the invention is to provide improved thermal printing methods and apparatus;

Another object is to provide an improved thermal transfer ribbon cartridge;

Another object to provide thermal printing apparatus including a method and apparatus for preventing the re-use of used thermal transfer ribbon;

Another object is to provide a thermal transfer ribbon cartridge including means for preventing the re-use of used thermal transfer ribbon; and Another object is to provide a method and apparatus for perforating or otherwise destroying postage value indicia patterns on used thermal transfer ribbon.

SUMMARY OF THE INVENTION

In printing apparatus of the type which includes means for thermally transferring ink from a ribbon to a workpiece, wherein the ribbon includes a backing layer and an ink donor layer, a printing process comprising the step(s) of transferring ink from the ink donor layer to the workpiece; and perforating the ribbon. Moreover, it is a feature of the invention to include the processing step of sensing perforating.

BRIEF DESCRIPTION OF THE DRAWINGS

FIG. 4A is a section, taken substantially along the line 4A—4A of FIG. 3, showing the thermal transfer ribbon as it is fed from the ribbon supply spool;

FIG. 4B is a section, taken substantially along the line 4B—4B of FIG. 3, showing the thermal transfer ribbon as it is fed to the thermal printhead for printing an image on a letter;

FIG. 4C is a section, taken substantially along the line 4C—4C of FIG. 3, showing the thermal transfer ribbon as it is fed from the thermal printhead after printing an image on a letter;

FIG. 4D is a section, taken substantially along the line 4D—4D FIG. 3 showing the thermal transfer ribbon as it is fed to the ribbon perforating apparatus;

DESCRIPTION OF THE PREFERRED EMBODIMENTS

Figure 1:
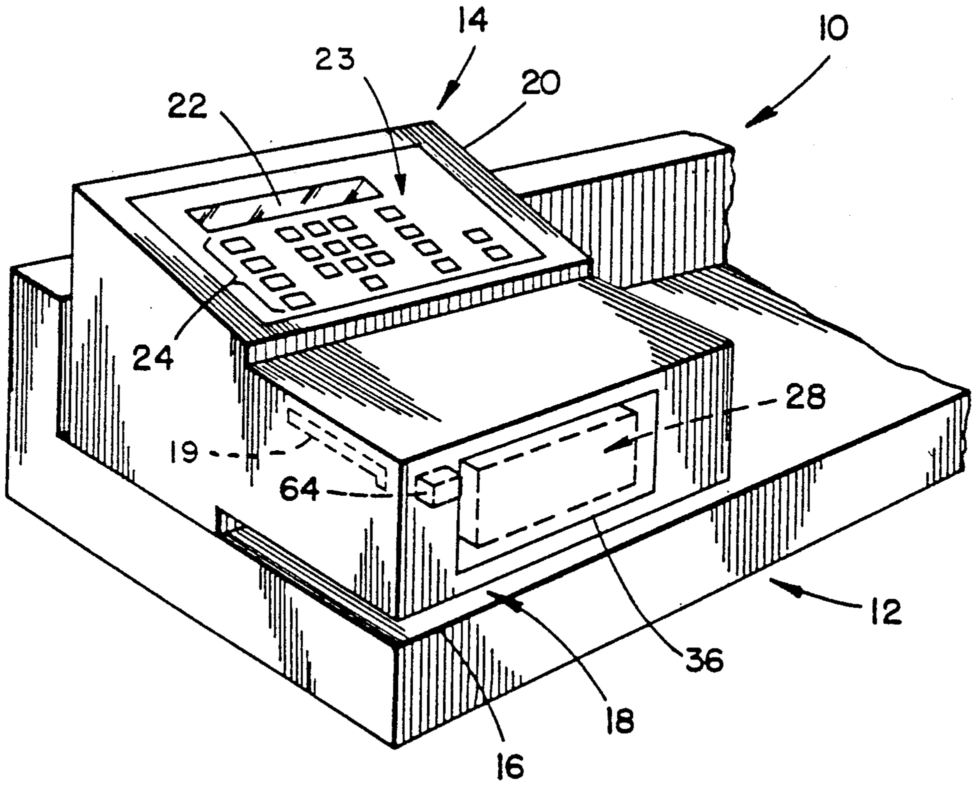
FIG. 1 is a partial perspective view of a mailing machine, including an electronic postage meter, embodying the invention.

As shown in FIG. 1, a mailing machine 10, of the type which may be modified to include the invention, generally includes a mailing machine base 12 and an electronic postage meter 14. The meter 14 is removably mounted on the base 12, which includes a platen 16. The meter 14 overhangs the platen 16 and defines therewith an indicia printing station, generally indicated at 18, for receiving letters manually fed thereto or fed thereto from a suitable feeder (not shown). The meter 14 generally includes conventional framework 19, a housing 20, a display 22, and a suitable keyboard 23 including a plurality of keys 24. In addition to the keyboard 23 and display 22, the machine's electronic circuitry 26 (FIG. 2) includes a microcomputer IC located within the meter housing 20 and conventionally operatively coupled to the keyboard keys 24 and display 22.

Figure 2:
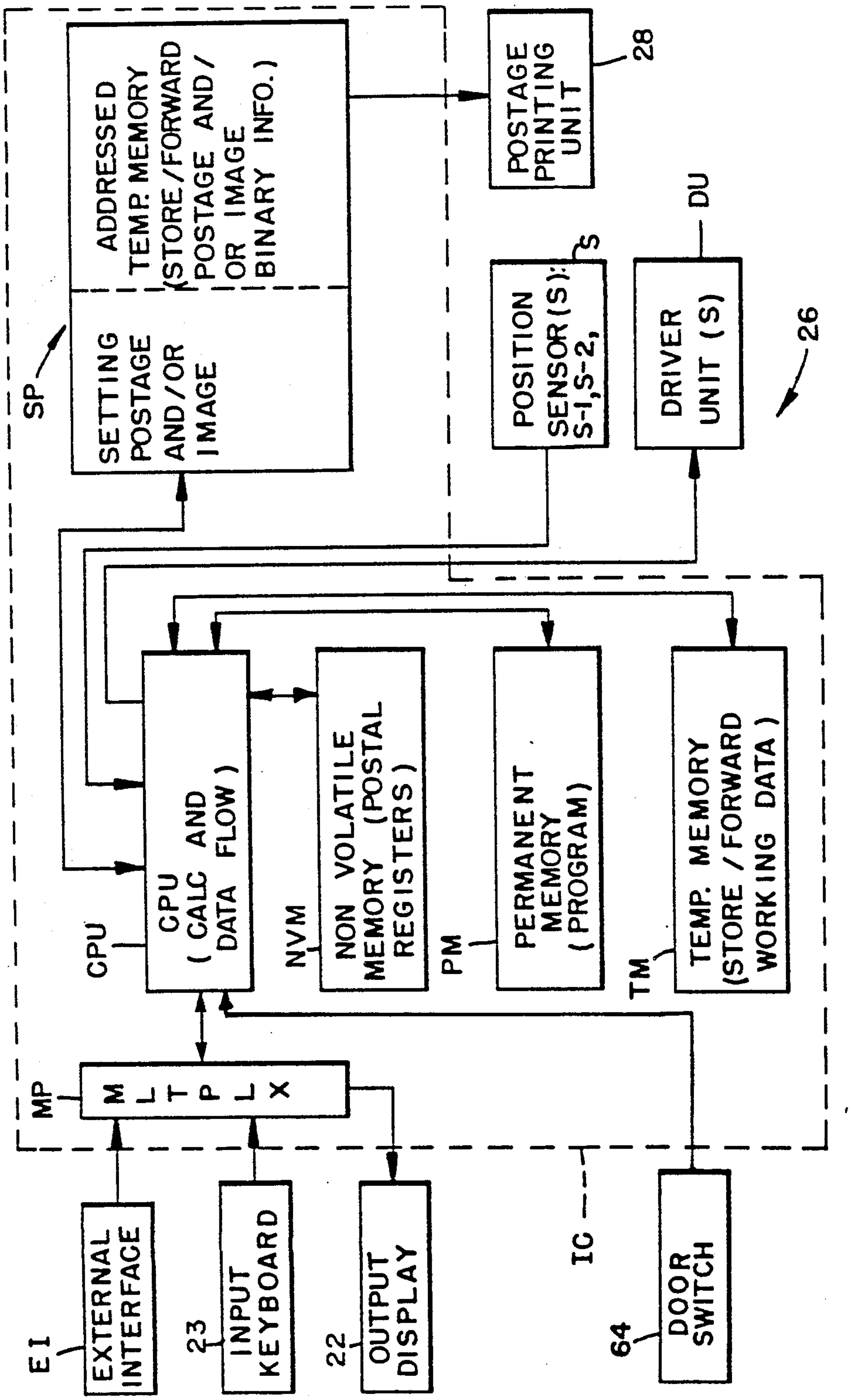
FIG. 2 is a schematic diagram of an electronic control system for operating the mailing machine of FIG. 1.

As shown in FIG. 2, the microcomputer IC includes a conventional CPU for performing processes based on input data received from the keyboard 23, a door switch 64 and any one or more external interfaces EI and sensors S. In addition, the CPU is operable for controlling the flow of data between the CPU and a permanent memory PM, temporary memory TM and non-volatile memory NVM. Moreover, the CPU is operable for controlling the flow of data between the CPU and postage setting circuitry SP for operating a postage printing unit 28. Further, the CPU is operable for receiving input data from various sensors S and for controlling one or more drive units DU. Preferably, the external interface EI and keyboard 23 are coupled to the CPU via a conventional multiplex circuit MP, and the CPU is coupled to the display 22 via the multiplex circuit MP.

The permanent memory PM is a conventional nonalterable memory, coupled to and controlled by the CPU for implementing programs stored in the permanent memory PM, including routines for performing postal data calculations in accordance with input data, and data stored in the memories TM and NVM, and for performing other routines for operating the machine 10 according to the invention. The temporary memory TM is a conventional working memory, coupled to and controlled by the CPU for temporarily storing working data in accordance with the routines performed by the CPU. And the non-volatile memory NVM is a conventional non-volatile memory, coupled to and controlled by the CPU, in which data is stored when the machine 10 is deenergized, for use whenever the machine 10 is energized. For example, the non-volatile memory NVM stores accounting and operating data critical to the security of the postage meter 14 and to the operation of the machine 10, including accounting data corresponding to the current total of all postage dispensed by the postage meter 14 and the current total of postage available for printing by the postage meter 14, which totals are respectively credited and debited with each postage dispensing operation of the postage meter 14. Further, the non-volatile memory NVM may store data corresponding to the maximum postage value that the meter 14 may dispense at any one time, data corresponding to the serial number of the postage meter and other selected postage meter operating constants.

In operation, data from the keyboard 23 (FIG. 1) or from an external interface EI, such as a scale, computer, mail management system, or the like, is received and processed by the CPU in accordance with routines stored in the permanent memory PM. At any time during the operation of the machine 10, should information corresponding to the data contents of a given memory, including the total available postage, total dispensed postage, or other accumulations, such as a batch count or the serial number of the postage meter 14, be desired to be displayed, an appropriate instruction from the keyboard 23 or external interface EI causes the CPU to access the appropriate memory location storing the corresponding data and operate the display 22 for displaying the information.

Under control of the CPU, when appropriate postal data information is provided from the keyboard 23 or external interface EI, and all of the conditions are met for dispensing postage, including for example a determination that the postage value desired to be dispensed does not exceed the maximum postage value that may be dispensed at any one time, the postage setting device SP will respond to an appropriate output signal from the CPU to generate a binary bit message addressed to an appropriate register of the temporary memory TM, indicating that the printing unit 28 has been initialized, i.e., the initial functions of setting the postage and readying the postage printing unit 28 for printing have been accomplished. A more detailed description of the above described electronic circuitry 26 may be found in commonly assigned U.S. Pat. No. 4,568,950 issued Feb. 4, 1986.

Figure 3:
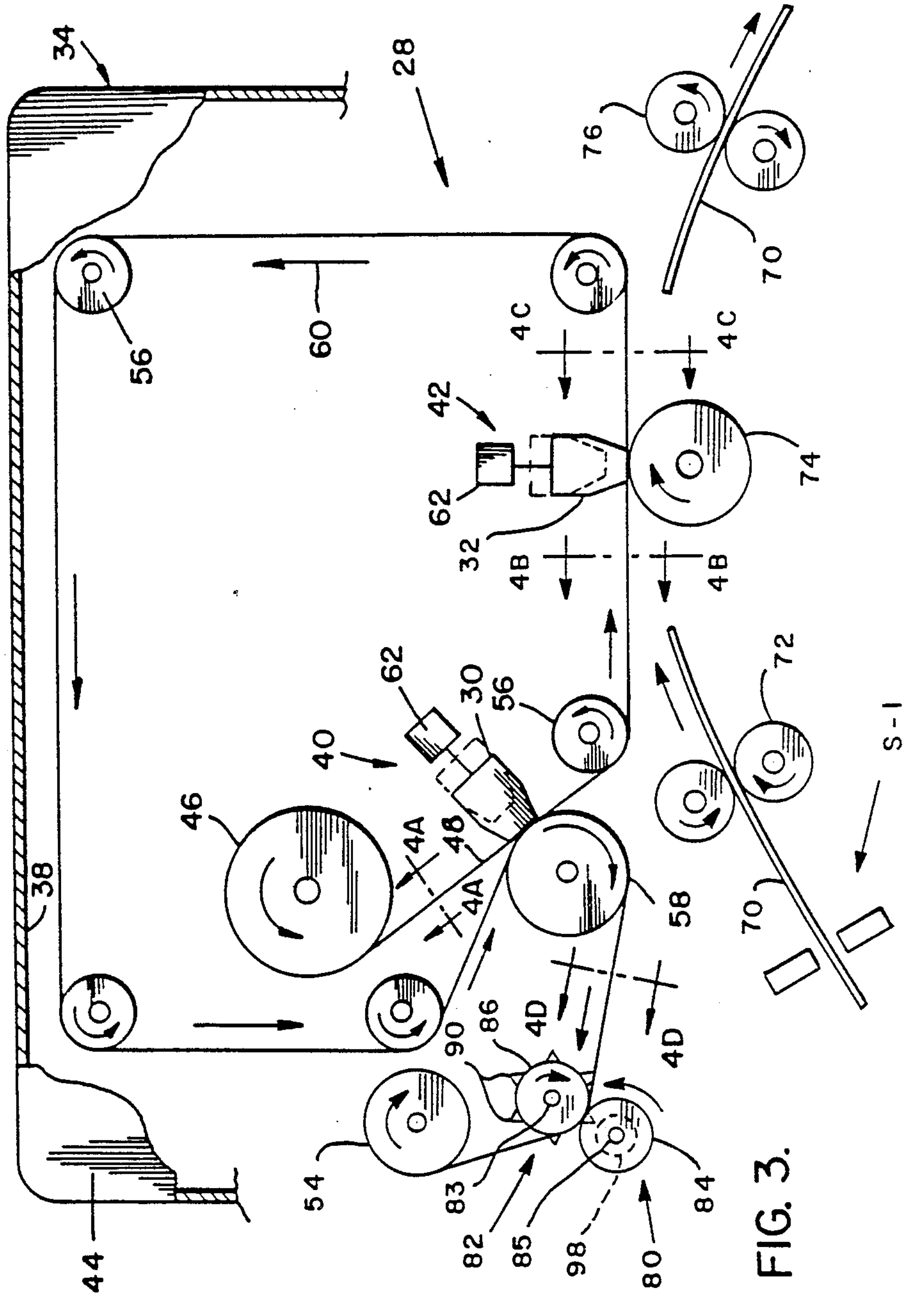
FIG. 3 a diagrammatic view of a thermal ribbon cartridge, including structure according to the invention for preventing re-use of the thermal transfer ribbon, as positioned within the postage printing unit of the machine of FIG. 1.

As shown in FIG. 3, the postage printing unit 28 includes two, conventional, commercially available, thermal printheads 30, 32 which are responsive to the output of the microcomputer IC (FIG. 2). The printhead 30 preferably includes a digitally responsive, single-line dot-matrix-type printhead element which is responsive to input data from the microcomputer IC for printing a pattern corresponding to a predetermined postage image including a variable postage value, whereas the printhead 32 preferably includes a heating bar 33 capable of operating at pressures in the range of from 2 to 20 lbs. per linear inch of the printhead 32 without appreciable wear. Preferably, both printheads 30, 32 are sufficiently small in size and mass to enable printing to commence immediately without a warm-up period. Thus, the printheads 30, 32 are capable of being heated to the required temperature for transferring ink from the ink donor layer 52 of the ribbon 48 substantially instantly, in response to energization signals applied to the printhead 30, 32 under the control of the electronic circuitry 26, and are capable of being cooled to a temperature below the ink transfer temperature substantially instantly, in response to deenergization signals applied to the printhead 30, 32 under the control of the electronic circuitry 26. A more detailed description of a typical printhead 30 is shown and described in Kobata U.S. Pat. No. 4,429,318 issued Jan. 31, 1984.

The housing 20 (FIG. 1) includes a hinged door 36, through which a ribbon cartridge or cassette 34 (FIG. 3) may be admitted for removable mounting within the housing 20 (FIG. 1) by any suitable means.

The ribbon cassette 34 (FIG. 3) includes a frame 38 which defines first and second printing stations, 40 and 42, respectively, and an integral enclosure 44 which houses the various components of the cassette 34. The cassette 34 includes a ribbon supply spool 46 which is conventionally rotatably connected to the frame 38 within the enclosure 44. A thermal transfer ribbon 48, which is wound about the supply spool 46 and extends therefrom, includes a backing layer 50 (FIG. 4A) which is preferably composed of a "MYLAR" brand plastic film, or equivalent, approximately 0.25 to 0.5 mils in thickness, and includes an ink donor layer 52 which is a thermally activatable ink coating applied to one side of the backing layer 50. In addition, the cassette 34 includes a ribbon take-up spool 54, which is conventionally rotatably connected to the frame 38 within the enclosure 44. The ribbon 48 extending from the supply spool 46 is suitably connected to the take-up spool 54. Further, for guiding the ribbon from the supply spool 46 to the take-up spool 54, the cassette 34 includes a plurality of idler rollers 56 and a printhead backing roller 58, which are respectively rotatably connected to the frame 38 within the enclosure 44. The backing roller 58 is located at the first printing station 40 opposite the printhead 30. As shown by the arrows 60, the ribbon path extends from the supply spool 46, through the first and second printing stations, 40 and 42, respectively, and again through the first printing station 40, then about the cassette's backing roller 58 to the takeup spool 54.

To facilitate threading or otherwise locating the thermal ribbon 48 (FIG. 3) in appropriate relationship with respect to the thermal printheads 30, 32 when the cassette 34 is inserted into the postage printing unit 28, each of the thermal printheads 30, 32, may be adapted to be moved between a non-printing, ribbon-locating position as shown by the dashed lines, and a printing, ribbon feeding, position as shown by the solid lines. Such movement has been achieved by means of the provision of a pair of two-position solenoids 62 operatively coupled on a one-for-one basis to each of the thermal printheads 30, 32; in which instance the solenoids 62 may be energized and deenergized by operation of a two-position switch 64 (FIG. 1) which is conventionally coupled to and operable by movement of the door 36. For example, movement of the switch 64 to one of its positions, in response to opening the door 36, energizes the solenoids 62 (FIG. 3) for causing the printheads 30, 32 to be positioned in their respective non-printing positions, whereas movement of the switch 64 (FIG. 1) to the other of its positions, in response to closing the door, deenergizes the solenoids 62 (FIG. 3) for causing the printheads 30, 32 to be positioned in their respective printing positions.

When the cassette 34 (FIG. 3) is inserted into the postage printing unit 28, the printhead backing roller 58 is operatively engaged with a driver unit DU (FIG. 2) which is conventionally constructed and arranged for appropriately rotating the printhead backing roller 58 under the control of the CPU, to feed the thermal ribbon 48 from the supply spool 46 and along the aforesaid feed path to the take-up spool 54. Moreover, the take-up spool 54 is preferably operatively engaged by another drive unit DU which includes a slip clutch (not shown) for spooling thereon the ribbon fed thereto from the printhead backing roller 58.

For feeding letters 70 (FIG. 3) to and from the second printing station 42, the machine 10 includes one or more pairs of input pinch rollers 72, a printhead backing roller 74 and one or more pairs of output pinch rollers 76, each of which rollers 72, 74 and 76, are conventionally rotatably connected to the machine's frame 19 (FIG. 1) and conventionally coupled to a driver unit DU (FIG. 2) for control by the microcomputer IC. Moreover, for sensing the leading edge of a letter 70 the machine 10 includes suitable sensing structure S-1 which is conventionally coupled to the CPU for providing an input data indicative that the leading edge of a letter 70 has been sensed.

Figure 5A:
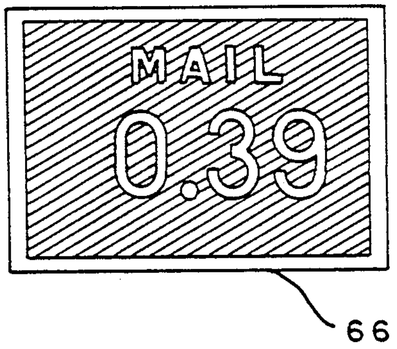
FIG. 5A is a pattern corresponding to an outline of an indicia.
Figure 5B:
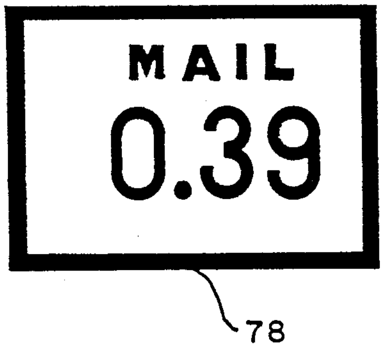
FIG. 5B is a pattern corresponding to an indicia.

As the thermal transfer ribbon 48 (FIG. 3) is initially fed from the supply spool 46, it has the longitudinally-extending cross-section illustrated in FIG. 4A, wherein the backing layer 50 is faced towards the printhead 30 (FIG. 3), and the ink donor layer 52 is faced away from the printhead 62, and has not as yet been altered thereby. As the ribbon 48 advances through the first printing station 40, the ribbon's ink donor layer 52 faces the backing layer of that portion of ribbon 48 which has most recently been advanced from the second printing station 42 and is looped about the backing roller 58. Under the control of suitable energization and deenergization signals received from the microcomputer IC (FIG. 2), the printhead 30 (FIG. 3) transfers ink from the ribbon's unaltered ink donor layer 52 to the adjacent ribbon backing layer 50. This results in an image pattern corresponding to an outline-of-indicia, or indicia background, 66 (FIG. 5A), being transferred to the adjacent backing layer 50 (FIG. 4D). In addition, this results in the thermal ribbon 48 (FIG. 3) leaving the printing station 40 having a remaining pattern corresponding to an indicia 78 (FIG. 5B) on the backing layer 50 (FIG. 4D) for printing on a letter 70 (FIG. 3) fed to the second printing station 42 by the input feed rollers 72. Thus as the letter 70 is fed between the ribbon 48 and the ribbon backing roller 74 at the second printing station 42 the indicia 78 (FIG. 5B) is thermally transferred to a letter 70 (FIG. 3).This results in the ribbon 48 fed from the second printing station 42, to the first printing station 40, including only the backing layer (FIG. 4C). The letter 70 (FIG. 3) is thereafter withdrawn from the printing station 42 by means of the output feed rollers 76. Although in this description the pattern of an outline-of-indicia 66 is described as being applied to the backing layer 50 at the first station 40, the pattern of the indicia 78 (FIG. 5B) may instead be transferred at the first station 40 (FIG. 3) whereby the remaining pattern of the outline-of-indicia 66 (FIG. 5A) would be transferred to the letter 70 (FIG. 3) at the second printing station 42.

According to the invention, the cartridge or cassette 34 (FIG. 3) additionally includes a ribbon perforating station, generally designated by the numeral 80, at which there is provided structure for perforating the thermal transfer ribbon 48; and more particularly for perforating the thermal ribbon 48 on which the indicia 66, 78 as the case may be, is printed at the first printing station 30. The perforating structure is located in the feed path of the ribbon 48 fed from the printhead backing roller 58 to the take-up spool 54. Preferably, the perforating structure includes a pair of mating, high-friction perforator and perforator backing rollers, respectively designated 82 and 84, which are suitably rotatably connected, by means of respective roller shafts 83 and 85, to the cassette enclosure 44 (FIG. 6) for disposition in engagement with the ribbon 48 (FIG. 3). Moreover, the roller shafts, 83 and 85 are each suitably operatively engaged by respective drive units DU (FIG. 2) when the cassette 34 (FIG. 3) is mounted in the machine 10, and, under the controls of a suitable routine implemented by the CPU, the rollers 82 and 84 are timely driven by the driver units DU. Thus, as the ribbon 48 is fed from the rollers, 82 and 84, by the take-up spool 54, the rollers, 82 and 84, are rotated by the moving ribbon 48.

The perforator roller 82 (FIG. 6) has opposite ends, 86 and 88, and a cylindrically-shaped, high-friction, outer surface 86 disposed in engagement with the backing layer 50 of the ribbon 48. In addition, the perforator roller 82 includes a plurality of ribbon perforating teeth or protrusions 90, which radially extend from the roller's outer surface 86. The protrusions 90 are spaced apart from one another and located at equal intervals along the circumference of the roller surface 86, preferably equidistantly between the roller ends 86 and 88.

The perforator backing roller 84 has opposite ends, 92 and 94, and a cylindrically-shaped, high-friction, outer surface 96. In addition, the perforator backing roller 84 includes a circularly-extending channel 98, having a generally U-shaped transverse cross-section. The channel 98 extends into the roller 84 from the outer surface 96, and coaxially with the axis of the roller shaft 85. Moreover, the channel 98 is appropriately located between the roller ends, 92 and 94, for receiving the protrusions 90 extending from the roller 82.

Figure 6:
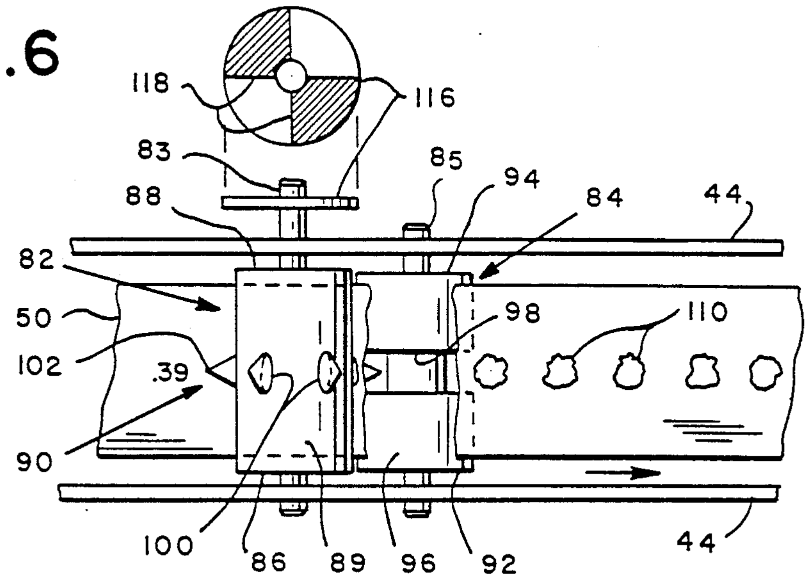
FIG. 6 is a diagrammatic view of a first embodiment of perforating apparatus according to the invention.
Figure 7:
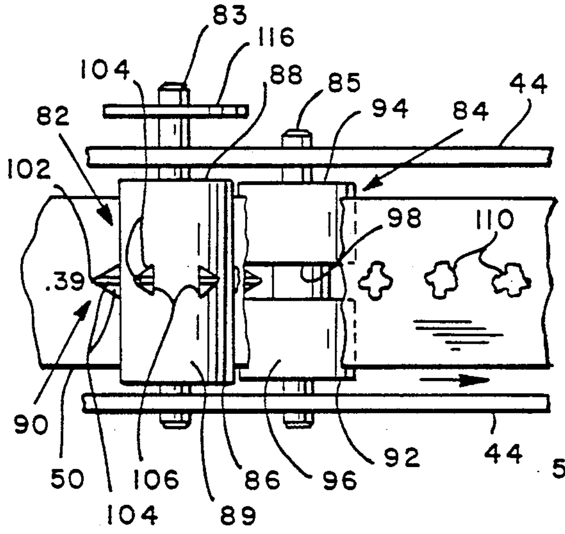
FIG. 7 is a diagrammatic view of a second embodiment of perforating apparatus according to the invention.
Figure 8:
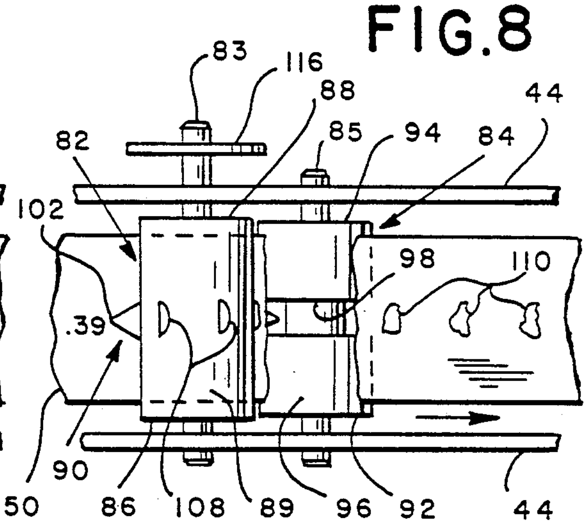
FIG. 8 is a diagrammatic view of a third embodiment of apparatus according to the invention.

As shown in FIG. 6, each of the perforator roller teeth or protrusions 90 is cone-shaped, is substantially circularly-shaped at the base 100, as viewed in transverse cross-section, and has a pointed outer end 102. Alternatively, as shown in FIG. 7, the respective protrusions 90 may include a plurality of triangularlyshaped portions 104, and be substantially cross-shaped at the base 106, as viewed in transverse cross-section, and have the pointed outer end 102. Moreover, the respective protrusions 90 may be any other shape having a pointed outer end 102, such as the half-cone-shaped protrusion 90 of FIG. 8, wherein the base 108 is substantially D-shaped as viewed in transverse cross-section.

In operation, the pointed outer ends 102 of the perforator roller protrusions 90 (FIGS. 3, 6, 7 and 8) pierce the ribbon 48 as the ribbon 48 is fed between the rollers 82 and 84. The ribbon 48 is frictionally engaged and held taught by the rotating, high-friction, roller outer surfaces, 86 and 96, as each protrusion end 102 is arcuately forced through the engaged ribbon 48 to form a fragmented opening 110 in the ribbon 48. Preferably, a sufficient number of perforator roller protrusions 90 are provided to ensure that the fragmented openings 110 formed in the ribbon 48 are sufficiently closely spaced along a line extending longitudinally through the postage value portion of the indicia 66 printed on the ribbon 48 to fragment the postage value portion of the postage indicia 66, thereby preventing re-use of the ribbon 48 for fraudulently printing the indicia 66. Of course, in the case of use of the ribbon 48 for printing parcel registration data on a label the perforator roller protrusions 90 are preferably sufficiently closely spaced to provide fragmented openings 110, along a line extending longitudinally through the shipping cost portion of the indicia 66 printed on the ribbon 48 to fragment the shipping cost portion of the indicia 66.

Figure 9:
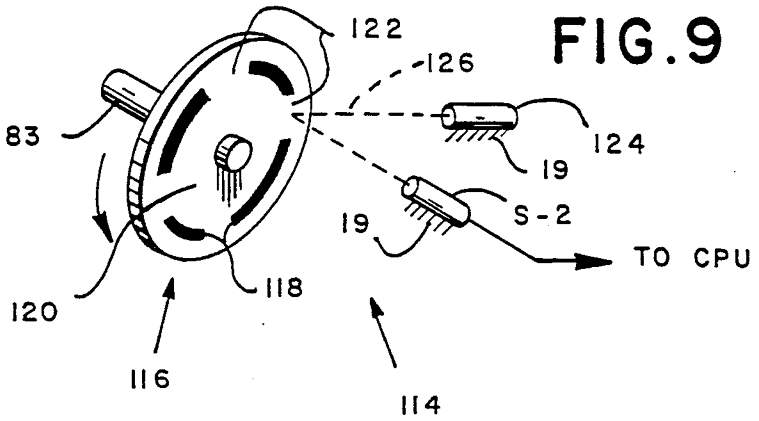
FIG. 9 is a diagrammatic view of detecting structure according to the invention.

According to the invention, the machine 10 additionally includes structure, generally designated by the numeral 114 (FIG. 9), for detecting whether or not the ribbon 48 fed from the printhead backing roller 58 is being wound on the take-up spool 54; and more particularly whether or not the perforator roller 82 is or is not perforating the ribbon 48 fed from the backing roller 58. The detecting structure 114 preferably includes a light reflective disc 116 (FIG. 6) which is suitably fixedly attached to the perforator roller shaft 83. The disc 116 is thus included with the cartridge 34. The disc 116 includes a plurality of light absorbing marks 118 at equidistantly-spaced intervals along at least the outer marginal edge of the face 120 of the disc 116, whereby a plurality of light reflective spaces 122 are formed on the disc face 120 between the non-reflective marks 118. In addition, the detecting structure 114 includes a light source 124 which is conventionally connected to the machine framework 19 for emitting a beam of light 126 which is directed to impinge on the face of the disc 116. Moreover, the detecting structure 114 includes an opto-electric transducer S-2, which is suitably connected to the framework 19 for receiving light 126 reflected from the disc 120. And the transducer S-2 is conventionally electrically coupled to the CPU (FIG. 3) for providing either an intermittent input signal indicative that light 126 is alternately being reflected from the disc's light reflecting spaces 122 and not reflected from the non-light reflective marks 118, for sensing that the disc 116 is being rotated by the moving ribbon 48 and the occurrence of ribbon perforation. On the other hand, the transducer S-2 also senses a constant input signal or the absence of input signal from the transducer S-2, indicative that the disc 116 is not rotating and the non-occurrence of ribbon perforation. Without departing from the spirit and scope of the invention, the opto-electric detecting structure 114 may be replaced by equivalent magnetic detecting structure. Moreover, it is within the scope of the invention to provide a plurality of openings at equal intervals along the marginal outer edge of the disc 116 and locate the light source 124 and transducer S-2 on opposite sides of the disc 116, whereby light from the source 124 would alternately impinge upon, and be blocked by the disc 116 from impinging upon, the transducer S-2 as the disc 116 rotates and the disc openings are, or are not, respectively, aligned with the light source 124 and transducer S-2.

In operation, assuming that the printing unit 28 has been initialized for printing, when the sensing structure senses the presence of a letter 70 (FIG. 3), the CPU (FIG. 2) implements a conventional routine for energizing the driving units DU (FIG. 2), thereby commencing rotation of the printhead backing roller 58 (FIG. 3) and take-up spool 54. As the take-up spool 54 feeds the ribbon 48 through the perforating station 80, the moving ribbon 48 is gripped by the perforator and perforator backing rollers, 82 and 84, resulting in the moving ribbon 48 causing the rollers 82 and 84 to commence rotating. As the ribbon 48 is fed through the first printing station 40, the printhead 30, under the control of the CPU, thermally transfers an image of the indicia pattern 78 (FIG. 5B) to the length of ribbon 48 (FIG. 3) engaging the printhead backing roller 58. Since the ink then remaining on the length of ribbon 48 fed to the second printing station 42 corresponds to the indicia pattern 78 (FIG. 5B) which is to be transferred to the letter 70 (FIG. 3) at the second printing station 42, the ribbon 48 is continuously fed through the first printing station 40 to the second printing station 42 until the completion of transfer of the indicia pattern 78 (FIG. 5B) to the letter 70 (FIG. 3) at the second printing station 42. Whereupon the CPU (FIG. 2) timely deenergizes the printheads, 30 and 32, and the driving units DU for the printhead backing roller 58 (FIG. 3) and take-up spool 54. Thus, the printhead backing roller 58 and take-up spool 54 are driven for a time interval corresponding substantially to the time interval from commencement of printing at the first printing station 40 to completion of printing at the second printing station 42. During that time interval, which is referred to in the art as the printing cycle, the take-up spool 54 feeds the ribbon 48 between the rollers 82 and 84, causing the rollers 82 and 84 to rotate, and, since the disc 116 rotates with the roller 82, the opto-electric transducer S-2 provides a continuously fluctuating input signal to the CPU (FIG. 2) indicating that disc 116 is rotating. According to the invention, if at any time during the aforesaid time interval the signal from the transducer S-2 does not fluctuate, i.e., there is either a constant signal or absence of signal from the transducer S-2 to the CPU, since this is indicative that the disc 116 is not rotating and thus that the used ribbon 48 is not being perforated, the CPU implements a conventional routine for discontinuing printing at both the first and second printing stations 40 and 42 and deenergizing the drive units DU for the printhead backing roller 58 and take-up spool 54. Accordingly, the printing unit 28 is shut-down in response to loss of the fluctuating signal from the transducer S-2 to the CPU if the perforating roller 82 stops rotating during the thermal transfer printing cycle.

In accordance with the objects of the invention, there has been disclosed improved thermal printing apparatus for processing letters, and more particularly apparatus for perforating used thermal transfer ribbon.

The specific embodiments of the thermal printing apparatus have been described for the purposes of illustrating the manner in which the invention may be made and used. Since the implementation of other variations and modifications of the invention will be apparent to those skilled in the art, the invention is not limited by the specific embodiments described. Accordingly, the following claims should be interpreted to cover the subject matter set forth therein and any equivalents of the invention that falls within the true spirit and scope of the invention.

What is claimed is:

1. In printing apparatus of the type which includes a cassette, a ribbon in the cassette, and means for thermally transferring ink from the ribbon to a workpiece, wherein the ribbon includes a backing layer and an ink donor layer, a printing process comprising the steps of:

(a) transferring ink from the ink donor layer to the backing layer;

(b) perforating the inked backing layer within the cassette; and (c) sensing step (b).

2. The process according to claim 1 including the step of:

(d) transferring ink from the ink donor layer to the workpiece.

3. The process according to claim 1, wherein step (a) includes the step of transferring ink in the form of postage indicia from the ink donor layer to the backing layer, and step (b) includes the step of perforating the postage indicia.

4. The process according to claim 1, wherein step (a) includes the step of transferring ink in the form of an outline of indicia from the ink donor layer to the backing layer, and step (b) includes the step of perforating the outline of indicia.

5. The process according to claim 3 including the step of transferring ink in the form of an outline of the postage indicia from the ink donor layer to the workpiece.

6. The process according to claim 4 including the step of transferring ink in the form of postage indicia from the ink donor layer to the workpiece.

7. The process according to claim 1, wherein step (a) includes the steps of feeding the ribbon through the first printing station and transferring ink thereat from the ink donor layer to the backing layer, and step (b) includes the step of feeding the inked backing layer through a perforating station and perforating the inked backing layer thereat.

8. The processing according to claim 1, including the step of terminating step (a) when perforating is not sensed.

9. The process according to claim 1 including the step of permitting step (a) while perforating is sensed and terminating step (a) when perforating is not sensed.

10. In printing apparatus of the type which includes a cassette, a ribbon in the cassette, and means for thermally transferring ink from the ribbon to a workpiece, wherein the ribbon includes a backing layer and an ink donor layer, a printing process comprising the steps of:

(a) feeding the ribbon from a supply spool;

(b) feeding the ribbon through a first printing station to a second printing station;

(c) transferring a portion of the ink from the ink donor layer to the backing layer at the first printing station;

(d) feeding the ribbon, less the portion of ink transferred from the ink donor layer, through the second printing station;

(e) transferring the remainder of the ink from the ink donor layer to the workpiece at the second printing station whereby the ribbon consists of the backing layer;

(f) feeding the backing layer through the first printing station;

(g) perforating the ink backing layer within the cassette;

(h) feeding the perforated inked backing layer onto a take-up spool; and (i) sensing the occurrence and non-occurrence of the perforating step.

11. The process according to claim 10 wherein the portion of ink transferred from the ink donor layer is in the form of an outline of indicia, and the perforating step includes the step of perforating the outline of indicia.

12. The process according to claim 10, wherein the portion of ink transferred from the ink donor layer is in the form of an indicia, and the perforating step includes the step of perforating the indicia.

13. The process according to claim 10 including the step of terminating the ink transferring steps upon sensing non-occurrence of the perforating step.

14. In printing apparatus of the type which includes a cassette, a ribbon in the cassette, and means for thermally transferring ink from the ribbon to a workpiece, wherein the ribbon includes a backing layer and an ink donor layer, a printing process comprising the steps of:

(a) transferring ink from the ink donor layer to the workpiece;

(b) perforating the ribbon; and (c) sensing step (b).

15. The process according to claim 14 including the step of:

(d) terminating step (a) when perforating is not sensed.

16. The process according to claim 14 including the steps of:

(d) permitting step (c) while perforating is sensed; and (e) terminating step (c) when perforating is not sensed.

17. In printing apparatus of the type which includes a cassette, a ribbon in the cassette, and means for thermally transferring ink from the ribbon to a workpiece, wherein the ribbon includes a backing layer and an ink donor layer, a printing process comprising the steps of:

(a) feeding the ribbon through a printing station;

(b) transferring ink from the ink donor layer to a workpiece at the printing station;

(c) feeding the ribbon from the printing station through a ribbon perforating station in the cassette;

(d) perforating the ribbon at the perforating station; and (e) sensing step (d).

18. The process according to claim 17 including the step of (f) terminating step (b) when perforating is not sensed.

19. The process according to claim 17 including the steps of:

(f) permitting step (b) when perforating is sensed; and (g) terminating step (b) when perforating is not sensed.

20. The process according to claim 17 including the step of:

(f) terminating steps (a), (b) and (c) when perforating is not sensed.

21. The process according to claim 17 including the steps of:

(f) permitting step (b) when perforating is sensed; and (g) terminating steps (a), (b) and (c) when perforating is not sensed.

* * * * *